United States Patent
Boots

[11] 3,890,909
[45] June 24, 1975

[54] DEVICE FOR ALIGNING, CUTTING AND COVERING SEED CANE

[75] Inventor: Vernie A. Boots, Belle Glade, Fla.

[73] Assignee: A. Duda & Sons, Inc., Oviedo, Fla.

[22] Filed: Mar. 8, 1973

[21] Appl. No.: 339,279

[52] U.S. Cl. .................. 111/1; 172/108; 111/85
[51] Int. Cl. .............................................. A01c 1/00
[58] Field of Search ............. 111/1, 2; 172/107, 108, 172/5, 6, 58, 73; 83/928; 30/379

[56] References Cited
UNITED STATES PATENTS

| | | | |
|---|---|---|---|
| 1,391,246 | 9/1921 | Collier | 172/108 X |
| 2,648,185 | 8/1953 | Dahlman | 171/58 X |
| 3,102,349 | 9/1963 | Thomson | 172/108 X |
| 3,168,785 | 2/1965 | Davis | 172/108 X |

Primary Examiner—Stephen C. Pellegrino
Attorney, Agent, or Firm—Julian C. Renfro, Esq.

[57] ABSTRACT

A device designed to travel through a field, aligning previously dropped seed canes so as to cause the canes to lie properly in furrows, with rotating cutter means on the device then acting upon the canes to cut them into comparatively short, essentially uniform lengths, so that sugar cane plants will thereafter sprout from the cut canes in a substantially uniform manner. Subsequent to the cutting, means carried by the device serve to move dirt on top of the cut canes to accomplish a covering thereof, and if desired, a packing wheel arrangement can be utilized such that the earth surrounding the canes will be packed quite firmly, thereby to further enhance the growth of the canes.

16 Claims, 7 Drawing Figures

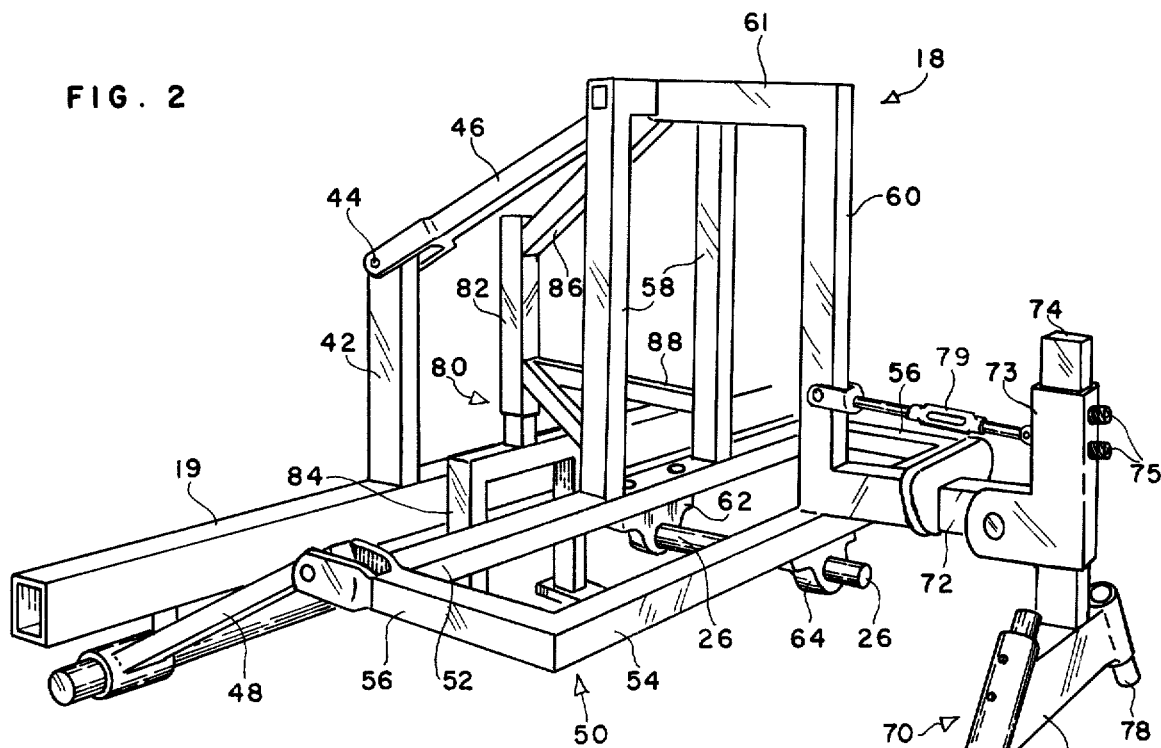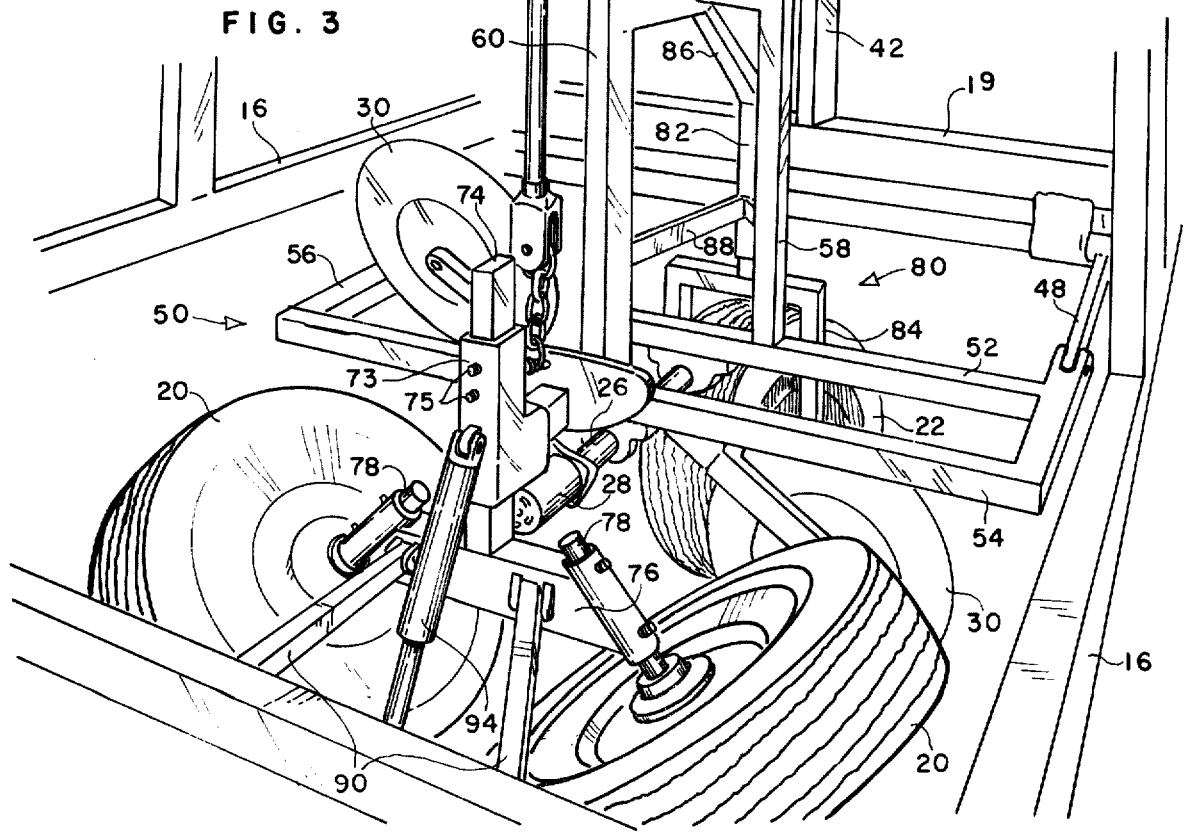

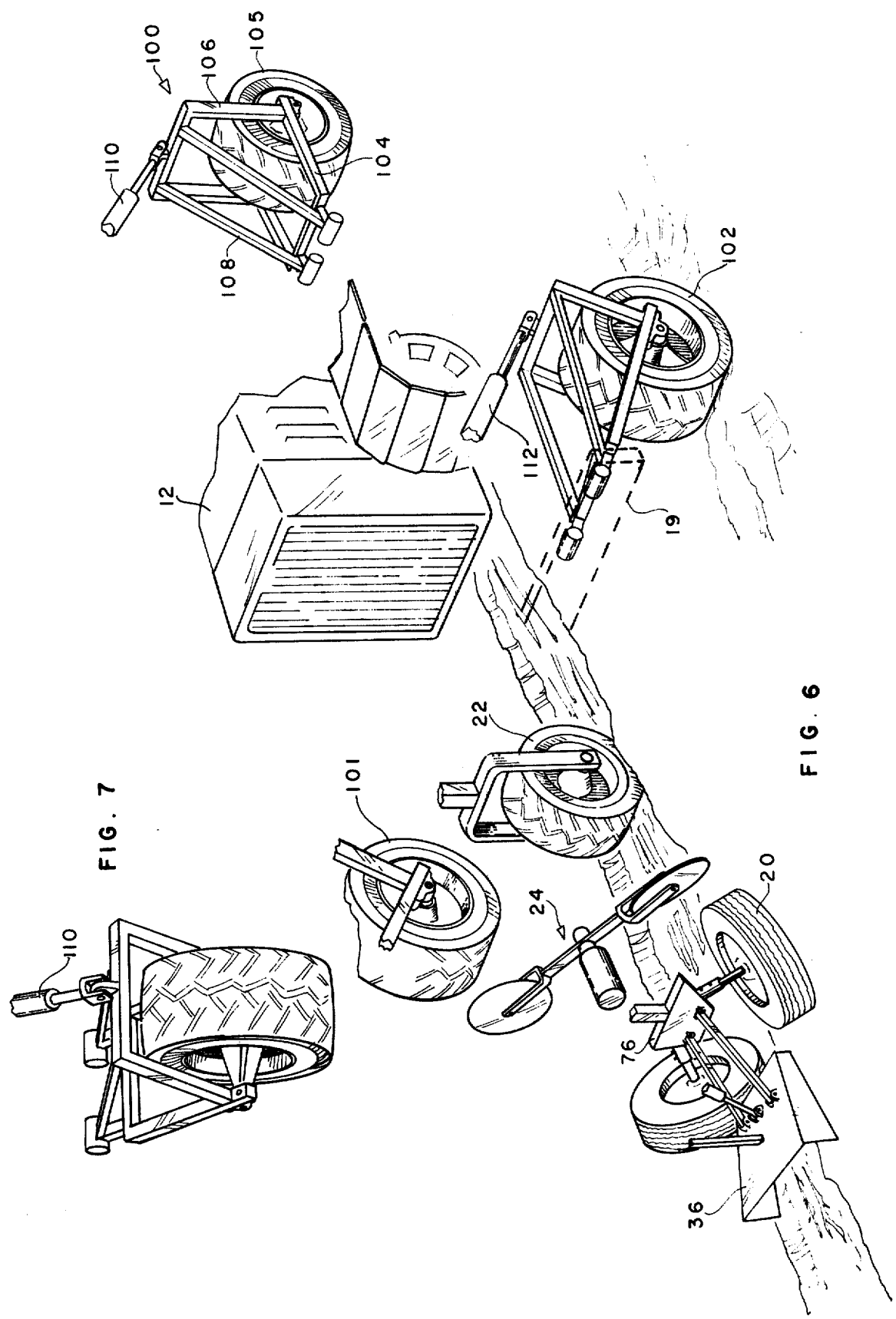

3,890,909

DEVICE FOR ALIGNING, CUTTING AND COVERING SEED CANE

BACKGROUND OF THE INVENTION

1. Field of the Invention

This device belongs to that class of machines involved with the planting of sugar cane, thus being concerned with circumventing the strenuous job previously done by workers employed to walk along furrows, kicking the seed cane into the furrows, and then cutting the canes into short lengths with hand-held knives.

2. Description of the Prior Art

While a number of machines have previously been concerned with the planting of seed canes, in all known instances, the canes have been cut to length at an earlier time, or else are cut to length immediately prior to the operation in which the canes are dropped or placed in the ground. These previous machines were of intricate construction and required extensive maintenance on the one hand, and on the other hand were generally unsatisfactory for the intended purpose. In contrast, the present machine is designed to follow along after a machine that has dropped seed canes of substantial length, typically being five to eight feet long, cutting the canes to length as they lie in the furrows, and then properly covering same.

SUMMARY OF THIS INVENTION

Advantageously, the present invention provides means for aligning the seed canes in the furrows before the canes are reached by the novel cane cutting mechanism, with other means being utilized for holding the canes in the furrows while they are being cut or severed by the cutting mechanism.

The cane cutting mechanism is preferably of a rotary type, and advantageously, the rotating cutter is driven from the tractor in such a manner that the rotative speed of the cutter assembly changes essentially linearly with the overland speed of the prime mover, thus enabling my device to cut the canes into essentially pre-established lengths, despite a variation in the speed of the prime mover over the ground.

Additional means include covering discs for accomplishing a covering over of the cut cane, and if required, a packing wheel arrangement can be utilized so that the earth will be tightly packed around the canes.

If desired, the can aligning, cutting and covering devices in accordance with this invention can be operated as multiple units thus to accomplish a substantially simultaneous planting of seed cane in several contiguous rows.

It is therefore a primary object of this invention to provide a machine for aligning, cutting and covering seed cane in one substantially continuous operation.

It is another object of my invention to provide an automatic, multi-component machine having thereon means for gathering and aligning the cane, cutting the cane to desired length, covering the cut cane, and then if desired, packing same, with but a single operator being required.

It is still another object of my invention to provide a multi-purpose cane cutting machine in which a rotating cutter assembly for cutting canes to length is carried by a floating frame movable along a furrow, with the weight of the floating frame being essentially borne by a wheel designed to travel along the furrow, which wheel serves to hold the canes essentially stationary during the period they are being acted upon by the rotating cutter.

It is yet another object of my invention to provide a cane cutting device in which a single prime mover can travel along a furrow and essentially contemporaneously bring about the cutting of canes residing in a plurality of furrows, with the canes of each furrow thereafter being firmly planted, and with the entire operation being conducted by a single operator.

These and other objects, features and advantages will be more apparent from a study of the appended drawings in which:

FIG. 2 is a fragmentary perspective view of the floating frame portion of my device, with certain portions removed in the interests of clarity;

FIG. 3 is a perspective view from a different angle of the floating frame, this view revealing the relationship to the main frame, and also showing the utilization in connection with the floating frame of the cutter assembly, the cane alignment means, and the means for supporting the floating frame as it travels along a furrow;

FIG. 6 is a schematic form of perspective view in which the principal components in accordance with this invention are illustrated in their approximate operational relationships, with the various frameworks normally utilized in connection with these components being omitted in this instance in the interests of clarity; and FIG. 7 is a fragmentary rear view of a typical packer wheel assembly of the type that may be used in accordance with this invention for tightly packing the earth surrounding the cut canes.

DETAILED DESCRIPTION

Figure 1:
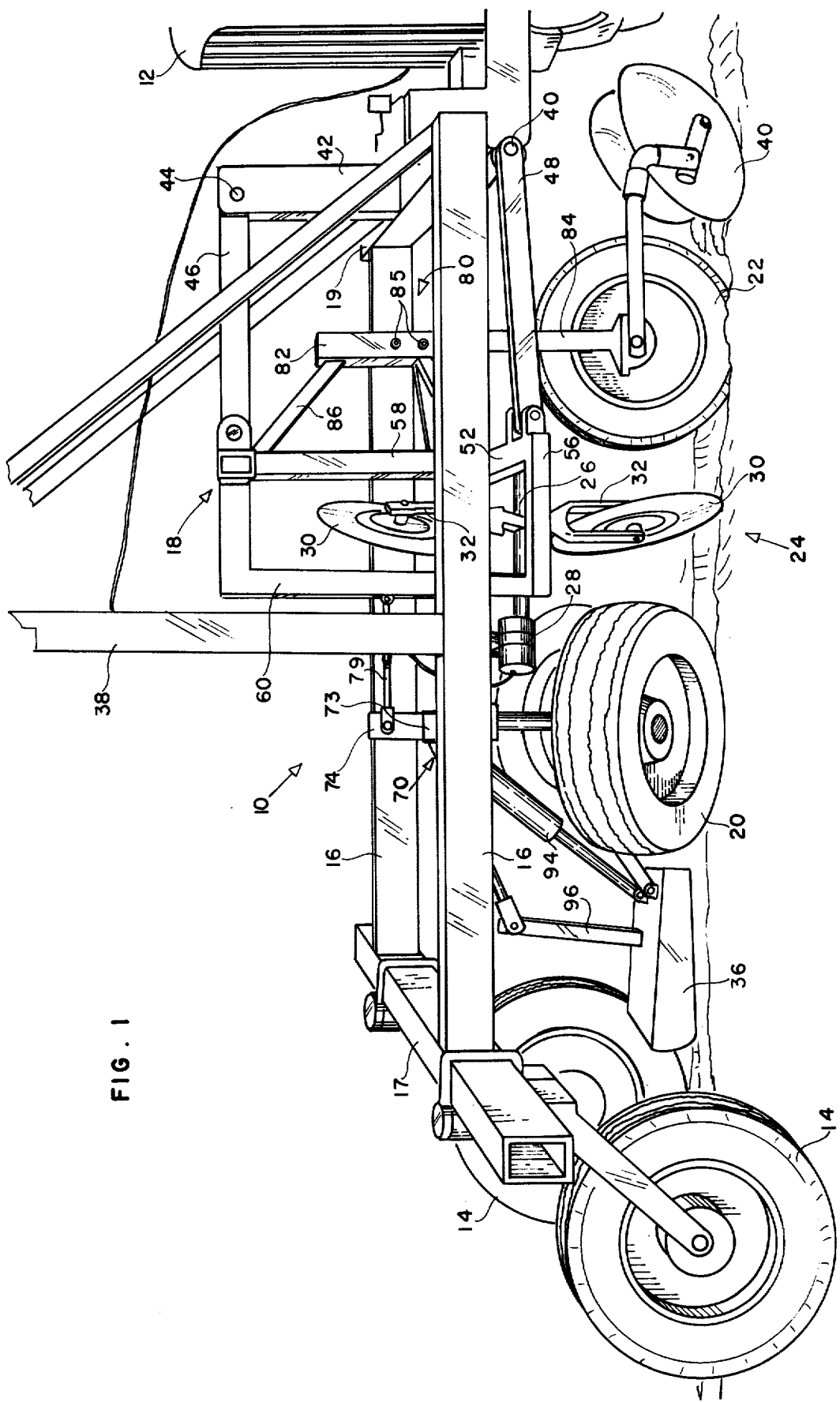
FIG. 1 is a side elevational view of my novel device for gathering, aligning, cutting, and covering seed cane in accordance with this invention.

As shown in FIG. 1, my novel seed cane cutting machine 10 has been designed to be mounted on the front of a tractor 12 or other type of prime mover, and to travel through the field with its castered front wheels 14 straddling the trench or furrow into which lengths of cane have previously been thrown. The instant machine serves to gather the seed canes and align them in the furrow, and a cutting device 24 mounted in a mid-portion of the machine cuts through the cane as it lies in the furrow, so as to sever the cane into appropriate short lengths, such as for example, into lengths of approximately 18 inches.

The front wheels 14 are designed to bear the weight of the main frame 16 of the machine, with these wheels being able to be turned to some extent in response to directional movements of the prime mover. This is because the rear of the frame 16 is firmly attached to the front of the tractor, so as the driver turns the tractor, the main frame is caused to turn, with this causing the castered wheels 14 to turn about their respective, substantially vertically-disposed pivots. Although the frame is thus fixed to the tractor in a horizontal sense, in the vertical sense the frame 16 can pivot upwardly or downwardly to some extent with respect to the tractor. The front wheels 14 are spaced similarly to the wheels or tracks of the prime mover, so that the same furrow can be straddled by each.

Supported by the main frame 16 is a floating frame 18, on the forward portion of which are a pair of angularly-disposed cane-straightening wheels 20, also referred to as collecting wheels. As will be seen, the wheels 20 are each rotatably mounted at a substantial angle to the vertical, which is to say that they encounter the cane that has been gathered by shield or front plate 36, and they serve to align the canes, forcing them into the bottom of the respective furrow. I usually prefer to dispose each wheel 20 to rotate at 45° to the vertical.

The shield or front plate 36 is adjustably attached at the forwardmost location of the floating frame 18, this serving, as just indicated, to gather and to place the canes in the furrow by virtue of the configuration of the lower surface of the member 36, thus enabling the cane collecting and alignment wheels 20 to cause the cane to be optimally placed in the furrow.

The sugar canes in 5 to 8 foot lengths were randomly dropped into the furrows prepared by a previous machine, which furrows for example may be spaced on 5 foot centers. The wheels 20 assure the proper placement of the canes in the furrows, with the vertically mounted carrying wheel 22 following centrally behind and serving to hold the canes in the furrow during the cutting operation now to be described. Wheel 22 is typically on the centerline of the frame 16 and the tractor 12, and carries substantially all of the weight of the floating frame 18.

Disposed between the angularly placed wheels 20 and the vertically mounted carrying wheel 22 is the aforementioned cutting device 24 or coulter assembly, which may take the form of a pair of rotatable discs 30 that are mounted to rotate about a shaft 26. The discs may for example each be 18 inches in diameter, with the radius from the shaft 26 to the extreme edge of a disc being 26 inches. The shaft 26 is preferably driven by a hydraulic motor 28 to which is connected tubing serving to supply the motor with fluid under pressure from a hydraulic pump (not shown) mounted on the tractor 12. The faster the tractor travels in response to the speed of its engine, the faster the hydraulic pump turns, and thus the more hydraulic fluid is pumped to the hydraulic motor 28. This in turn causes faster rotation of the discs 30 about the shaft 26. This is to say, the relationship between the speed of the tractor engine and the hydraulic motor 28 are worked out such that every eighteen inches or so, one of the discs 30 come in contact with the cane now in the furrow, thus assuring that each piece of cane is severed into desirable short lengths. To have cut the cane into short lengths before planting would have greatly increased the labor and time required for planting.

Obviously I am not to be so limited, but I prefer for the motor 28 to be an Orbit Model M motor, made by Char-Lynn Company of Eden Prairie, Minn. Such a motor has 17.9 cu. inch displacement per revolution, and when supplied with hydraulic fluid at 500 psi at the rate of 8 gallons per minute, will provide 117 revolutions per minute. The engine mounted hydraulic pump may be Gressen RJ2000.

Because the tractor and the cane cutter are constantly moving forward during the cutting operation, this makes it desirable for the forks 32 in which the discs 30 are rotatably mounted to in effect be twisted somewhat, thus preventing the discs from being dragged somewhat sideways for an inch or two during their passage through the ground. In other words, instead of the discs 30 cutting through the ground at 90° to the direction of forward movement, they instead cut through the ground at perhaps a 70° or 80° angle, with the twist of the forks 32 making these cuts conveniently possible. As previously mentioned, the centrally disposed wheel 22 carried substantial weight, and serves to hold the canes in the ground (furrow) while the cutting thereof is being accomplished by the sharpened discs.

A superstructure 38, partially visible in FIG. 1, is supported by the main frame 16, with an actuator being utilized on the superstructure such that the floating frame 18 can on occasion be lifted with respect to the main supporting frame 16. Piston portion 39a of the actuator is visible in FIG. 3. This arrangement of course makes it possible for the discs 30 to be lifted to an extent sufficient to clear the ground during travel to and from the cane planting fields.

As will hereinafter be discussed, more than one cutting assembly may be utilized with a single prime mover, but for the time being, the invention will be explained with regard to a single cutting assembly.

The present machine may be immediately followed by a covering plow (not shown) that causes earth to be placed over the cut seed canes, but I ordinarily use covering discs 40 following the wheel 22, as shown in FIG. 1.

In order that a better understanding of the floating frame 18 may be obtained, attention is now primarily directed to FIG. 2, which is a fragmentary view from which a number of active components have been omitted in the interests of clarity and simplification.

On the rear central portion of the main frame 16, as seen in both FIG. 1 and FIG. 2 is a vertically disposed member 42, which is a rigid steel component of substantial size that is preferably welded to the rear member 19 of the frame 16 at a location substantially corresponding to the centerline of the tractor 12, the frame 16, and the cutting assembly. Pivotally attached at 44 to the upper portion of the member 42 is a link 46, that typically is maintained throughout all movements of the floating frame 18 in substantial parallelism with a pair of lower links 48. The rear portions of the links 48 are pivotally attached to the underside of the rear frame member 19.

The forward portions of the single link 46 and the lower links 48 are pivotally attached to subassembly 50, which is the main portion of the floating frame 18, being principally composed of horizontal members 52 and 54, extending in the left-right or lateral direction with respect to the path of travel of the device, with the members 52 and 54 being held in the rectangular configuration by a pair of end members 56 welded or otherwise secured thereto. Extending upwardly from member 52 are a pair of spaced vertical members 58, and extending upwardly from member 54 is a vertical member 60. The upper portions of the member 58 and 60 are rigidly joined together by a T-shaped member 61, with welding typically being utilized at each juncture where movement is not desired. It is at the rear portion of the member 61 that the upper link 46 is pivotally attached.

The subassembly 50 is rigid, preferably being made of tubular steel members of square cross section. To this subassembly, the previously-mentioned angularly placed wheels 20 and the weight—carrying wheel 22 are attached, with the arrangement being such that subassembly 50 in effect floats over the ground. Support for subassembly 50 is principally derived from the wheel 22, with contact with the main frame 16 during operation of the device being limited to the upper and lower link members 46 and 48. Because these links employ pivotal connections, the subassembly 50 of the floating frame 18 can move either upwardly or downwardly away from the relationship to frame 16 revealed in FIG. 1, as may be occasioned by changing ground contour.

With continued reference to FIG. 2, it will be seen that shaft 26, previously mentioned, is supported below members 52 and 54 by members 62 and 64, respectively, with it of course to be understood that appropriate bearings are provided in members 62 and 64 so that the shaft 26 may be freely turned therein. It will be recalled that the cutting device 24 utilizes a pair of discs 30 supported by the shaft 26, with the radius of the cutting device dictating to a considerable extent the height that the members 58 and 60 extend above the members 52 and 54, for it is between the pair of members 58 and the member 60, and between the members 52 and 54, that the discs 30 of the coulter assembly rotate.

The angularly placed wheels 20 described in connection with FIG. 1 are supported by front assembly 70, shown in FIGS. 2 and 3. This front assembly is supported from a forwardly-extending member 72 associated with the subassembly 50, as best seen in FIG. 2. Pivotally attached to the front of member 72 is a somewhat L-shaped member 73, having a vertically-disposed forward portion. This vertically-disposed forward portion is hollow and vertically slidable therein in close fitting relationship is a member 74. Suitable locking means, such as two bolts 75, are threaded into the member 73, with their inner ends bearing against the member 74, to hold it in the selected position.

Provided on the lower portion of vertically disposed member 74 is a mounting member 76, with the axles 78 of the wheels 20 being rotatably mounted in member 76 at a considerable angle to the horizontal. As previously pointed out, these wheels are angularly disposed, such as at a 45° angle to the vertical, in order that they may be effective to gather and align the canes in the furrow. Turnbuckle means 79 is provided, extending between member 60 and member 73 as shown in FIG. 3, in order that the relationship between these members may be controlled. Ordinarily the turnbuckle is adjusted to be of a length such that the members 73 and 74 are essentially parallel to member 60, and therefore substantially vertical. However, there are instances in which it may be desirable to adjust the turnbuckle to cause the member 74 and thus the wheels 20 to bear a different relationship than that described.

The vertically mounted wheel 22 described in connection with FIG. 1 is held in the desired vertical attitude by a rear assembly 80, with this rear assembly involving the use of a vertical member 82. Slidable in member 82 is a vertically adjustable member 84 whose lower end divides so as to define what may be regarded as a fork or yoke, between the arms of which the axle of the wheel 22 is rotatably supported. A pair of locking set screws 85 are threaded into member 82, as shown in FIG. 1, the inner ends of which serve to hold the member 84 at the selected position with respect to member 82.

An upper brace 86 extends between the member 82 and the upper portion of vertical members 58, and a pair of generally horizontal members 88 (FIG. 2) extend between the member 82 and a lower portion of members 58. These members 86 and 88 are rigid members, typically welded in place, and serve to hold the member 82 in desired fixed relationship to the subassembly 50, in which the adjustable member 84 is typically disposed vertically. The previously-described locking means 85 are utilized such that the desired height relationship between the wheel 22 and the subassembly 50 may be selectively brought about.

Returning briefly to FIG. 1, it will be noted that the wheels 20, the wheel 22, and one of the discs 30 of the floating frame 18 are each illustrated in contact with the ground. This is a desirable relationship and is brought about by selective heightwise adjustment of the wheel member 22 with respect to the floating frame, accomplished by the previously mentioned adjustment of wheel supporting member 84 with respect to member 82. I normally operate the discs such that the ground-contacting cutting edge is approximately 3 inches below the level of the bottom of wheel 22, so that I can be assured that canes in the bottom of a furrow will be severed. As should now be apparent, in order to make depth of cut type changes, I loosen the set screws 85, slide the vertically adjustable member 84 in the appropriate direction in the member 82, and then retighten the screws.

FIG. 3 reveals the subassembly 50 with the coulter assembly 24 installed in the operative position, such that the discs 30 swing between the horizontal members 52 and 54, and between the vertical members 58 and 60. This figure also reveals links 92 of a frame 90 secured to the front of the bifurcated member 76, these being associated with the adjustable support of the front plate 36 in the desired position with respect to the furrow. These components will be discussed hereinafter at greater length.

Figure 4:
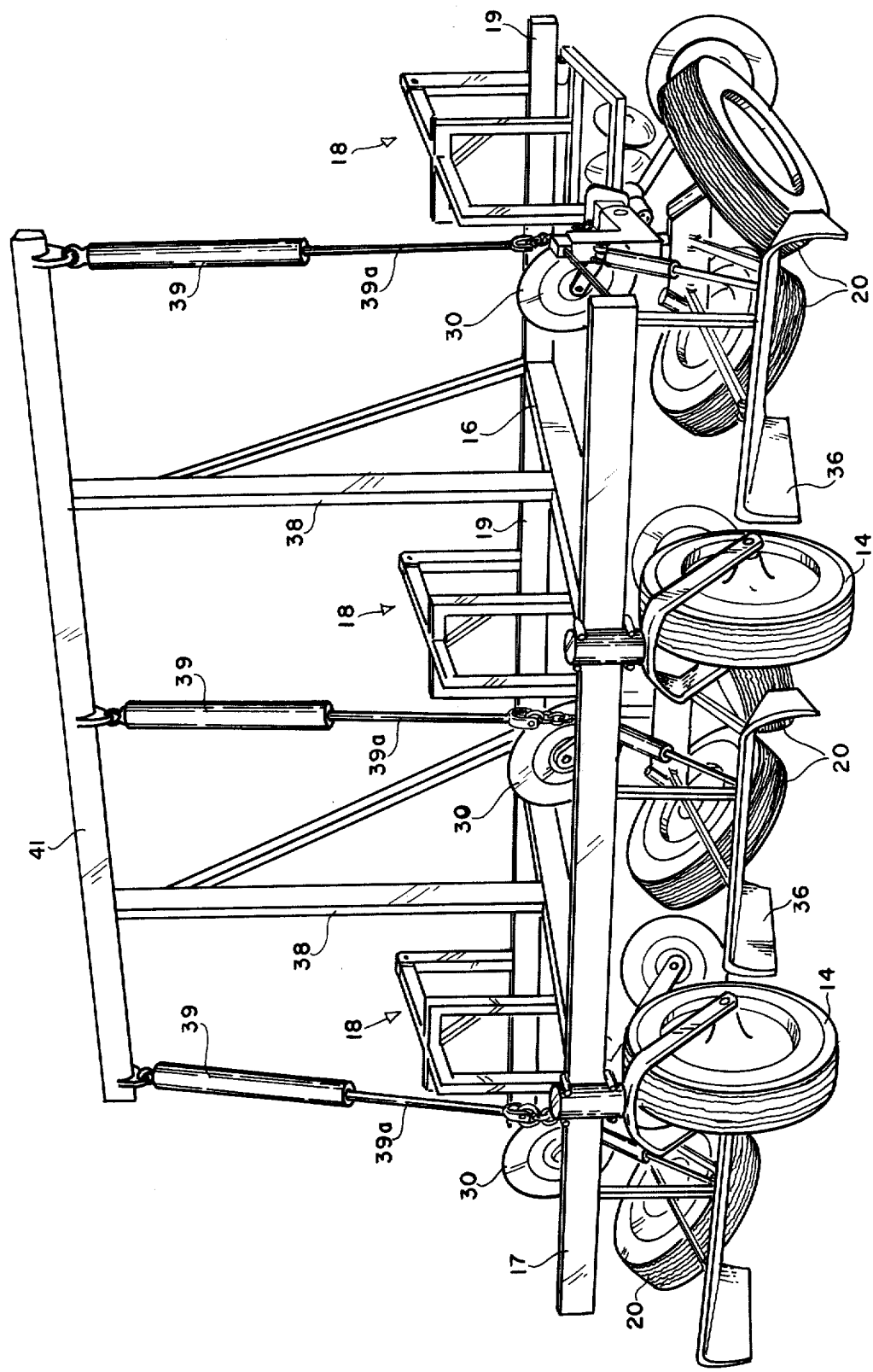
FIG. 4 is a perspective view of an embodiment of my invention in which a multiplicity of cutting units are operated from a single prime mover, such that canes residing in a plurality of furrows may be cut and covered at essentially the same time.

As previously mentioned, I am not to be limited to an arrangement in which a single cutting device in accordance with this invention is mounted on the front of a prime mover. Rather, as revealed in FIG. 4, a device or embodiment in accordance with this invention may involve a main frame 16 whose front member 17 and rear member 19 are of elongate construction, so much so that a multiplicity of cutting devices in accordance with this invention can be mounted in a parallel array, and powered by a single prime mover. As an example, three cutting devices are here shown, thus enabling canes in three adjacent rows to be simultaneously cut. This arrangement of course may involve three members 42 being welded in spaced relation upon the rear member 19 of frame 16, as shown in FIG. 4. Also involved are a separate pair of angularly placed wheels 20, and a separate wheel 22 for use with eah floating frame 18, but with only a single pair of castered wheels 14 being required for supporting the weight of the main frame 16. As with the single cutter embodiment, each of the three cutting assemblies shown in FIG. 4 involves the use of a floating frame 18, with the wheels 22 associated with the various floating frames providing the support therefor, and of course permitting a considerable amount of relative motion to take place between each of the floating frames, both with respect to each other, and with respect to the main frame 16.

Superstructure 38, as previously mentioned, is provided on the main frame to enable any or all of the floating frames 18 to be lifted out of contact with the ground, this typically being done when the device according to my invention is being taken along a road or highway. Vertical members 37 support a horizontally-disposed member 41, that is visible in FIG. 4. Member 41 is the uppermost member of the superstructure, and elongate actuators 39, preferably hydraulic actuators are suspended from this horizontally-disposed member. Piston portion 39a of each of these actuators is attached adjacent the forward portion of the respective floating frame 18, typically adjacent the members 72 in the manner fragmentally revealed in FIG. 3. By the operator selectively porting hydraulic fluid to the appropriate end of each actuator 39, each may be caused to operate and to achieve the desired lifting of the respective floating means 18. This selective porting of hydraulic fluid is of course accomplished by the appropriate manipulation of controls provided on the tractor for this purpose.

As previously mentioned, I may prefer for each front plate 36 to be adjustable, thus to enable the operator of the tractor 12 to selectively position such front plate or plates so as to achieve the optimum gathering of canes such that the angularly disposed wheels 20 can properly encounter the canes and align them in the desired positions in the furrows. To this end, I dispose the adjustable framework 90 with respect to the vertically adjustable members 74 and 76, such that the basic position of the plate 36 will be proportionately moved as the height of the wheels 20 is established.

Figure 5:
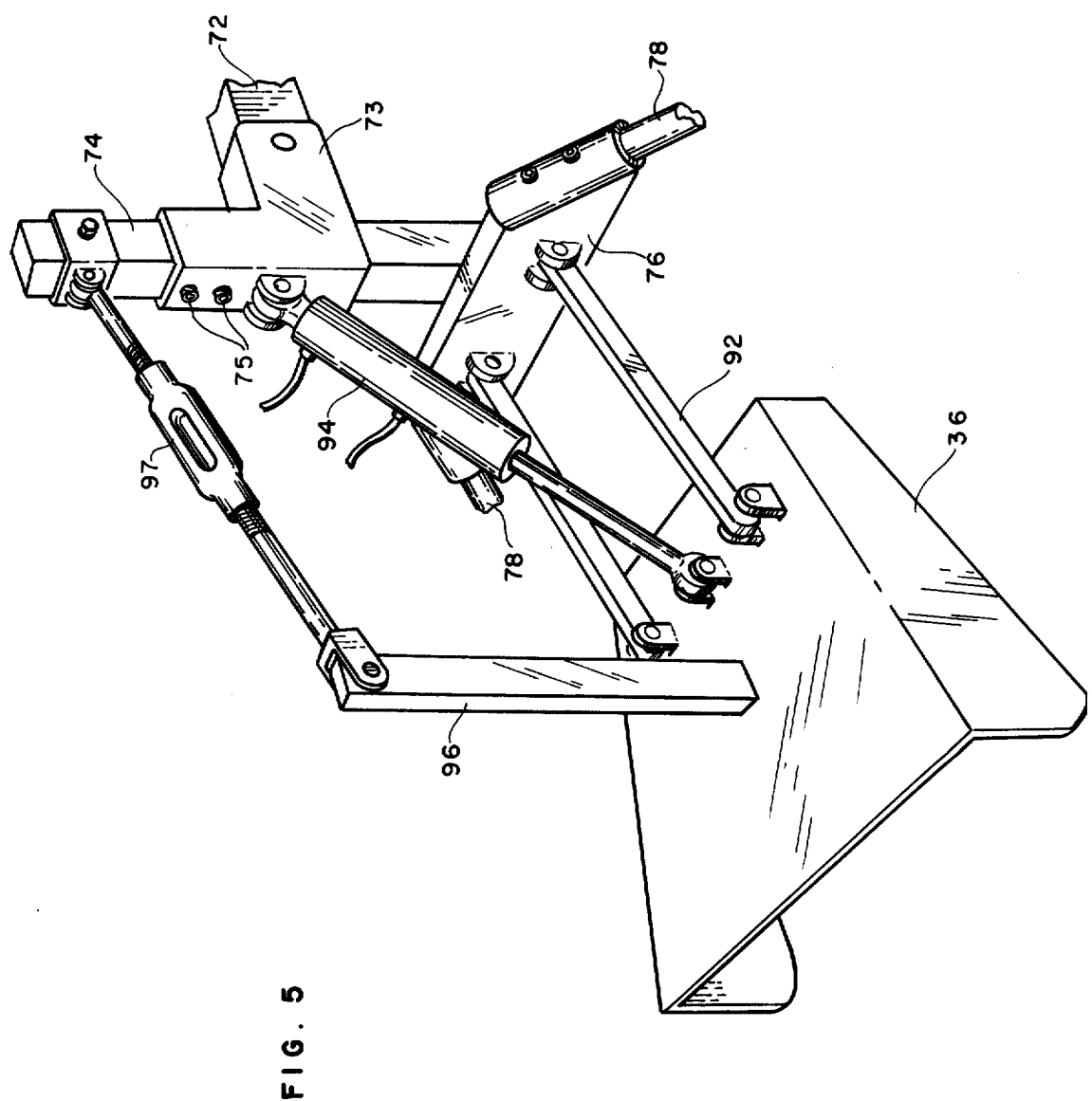
FIG. 5 is a perspective view of an adjustable cane gathering means utilized on the front of the floating frame for causing encountered canes to be disposed in a particularly advantageous position for alignment and cutting to length.

A pair of links 92 are pivotally attached to the mounting member 76 and to the rear of the front plate 36, as best seen in FIG. 5, thus defining the horizontal position of the front plate 36 with respect to the member 76. One or more actuators 94, typically fluid actuators, are utilized in the framework 90 associated with the front plate. As seen in FIG. 5, the single actuator 94 is mounted upon member 73, and the piston member pivotally attaches to the plate 36, thus to enable the height of the plate to be determined.

By the operator of the prime mover causing the actuator 94 to extend, the front plate is caused to move more closely to the ground, whereas by porting hydraulic pressure in the opposite direction, the effective length of the actuator is caused to decrease.

A vertical member 96 is welded in an upper central portion of the plate 36, and a turnbuckle member 97 interconnects the upper portion of member 96 with the upper portion of vertically movable member 74. By virtue of this construction, the turnbuckle 97 stays essentially parallel to the links 92 throughout all length type adjustments of the actuator 94, for a pivotal type joint is utilized at each end of the turnbuckle and at each end of the actuator. This arrangement makes it possible for the plate 36 to stay essentially parallel to the ground irrespective of its height above the ground.

Although the apparatus described thus far is in many instances entirely suitable insofar as aligning, cutting, and planting the canes is concerned, nevertheless there are instances in which conditions are such that it is necessary or desirable to pack the ground surrounding the canes more firmly, and to that end, I may prefer to utilize one or more packing wheel units of the types shown generally in FIG. 6 at 100, and if a multi-unit arrangement is utilized, at 101 and 102. In this figure, a single cutting device or coulter assembly 24 is shown in connection with the single furrow being straddled by the tractor or other prime mover 12. Preceding the cutting device is of course a front plate 36 utilized for gathering and generally aligning the canes, and the angularly disposed wheels 20 utilized for accomplishing the alignment of the canes and assuring their placement in the furrow. Thereafter, the cutting of the canes takes place, with the vertically mounted, frame-supporting wheel 22 serving to hold the canes essentially stationary on the ground or in the furrow while they are being acted upon by the cutting device 24.

In the illustrated instance, a packing wheel unit 100 is utilized, pivotally attached on the rear of the tractor 12 in such a way that it travels along the straddled furrow and presses down firmly upon the earth that has been moved into place over the canes by the action of the covering discs or wheels 40, previously described.

As will be noted, the supporting frame 104 for the packer wheel 105 is generally U-shaped, with the base of the U-shaped frame being pivotally attached to a suitable rear portion of the tractor, and with the arms of the frame supporting therebetween an axle upon which the wheel 105 is rotatable. An additional frame portion 106 is welded to the frame 104 near the axle location, which additional frame is typically secured in a right angle relationship to the frame 104 by the use of brace member 108.

Attached to an upper central portion of the frame 106 is the rod portion of an actuator 110, the principal end of which actuator being attached to a rear portion of the tractor 12 at a location substantially above the location at which the frame 104 attaches.

FIG. 7 is a fragmentary illustration of a typical packer wheel assembly as viewed from another angle. As should now be clear, upon the operator of the tractor causing hydraulic fluid to be ported so as to bring about the elongation of the actuator 110, the packer wheel 105 is caused to press firmly down upon the earth, and to achieve the desired packing of the canes. Quite obviously, I prefer for there to be provided control means such that the operator can regulate or control the amount of pressure applied by the packer actuator.

It will be noted from a study of the FIG. 6 that outboard packing wheel units 101 and 102 may also be utilized in the event that a three unit arrangement of the type taught in FIG. 4 is employed, with the units 101 and 102 achieving the packing of the furrows located on either side of the furrow along which the tractor is traveling. I prefer for the frames upon which the outboard packer wheels are mounted to be pivotally attached to the rear of elongate rear frame member 19, with an actuator being utilized in the same manner with respect to the outboard units as was the actuator 110 utilized in the case of the unit located along the centerline of the tractor. For example, the outboard actuator 112 associated with packer unit 102 may be mounted upon the respective member 42, and upon the operator causing the actuation of this actuator, a desirable compression of the earth surrounding the canes of this outboard furrow will be achieved. A like arrangement is of course associated with unit 101.

I claim:

1. A seed cane cutting device comprising a wheeled main frame that can be caused to move through a field, a floating frame pivotally connected to said main frame, said floating frame supporting a rotary type cutter assembly, said cutter assembly being disposed in a position to cut seed cane lying on the ground during its rotation, with the plane in which said cutter assembly is operative being substantially perpendicular to the path of travel of the prime mover, means for driving said cutter assembly in rotation in a pre-established relationship to the speed of travel of the prime mover over the ground, such that the faster the prime mover travels, the faster said cutter assembly is caused to rotate, said floating frame utilized for carrying said rotating cutter assembly having a wheel operatively disposed on its underside aft of said cutter and operatively associated therewith, said wheel serving not only to support a substantial portion of the weight of said floating frame, but also able to hold substantially stationary during the cutting operation, the canes encountered and acted upon by said cutter assembly.

2. The seed cane cutting device as defined in claim 1 in which a pair of angularly disposed wheels are operatively associated with a forward portion of said floating frame, said angularly disposed wheels being in rolling contact with the ground and utilized for aligning the canes prior to the encounter thereof with said cutter assembly.

3. The seed cane cutting device as defined in claim 2 in which a front plate is utilized on the front for gathering canes lying in the field.

4. A device for cutting seed cane, comprising a wheeled main frame that can be caused to move through a field, a floating frame pivotally connected to said main frame and vertically movable to at least some extent with respect to said main frame, at least one wheel located on the underside of said floating frame for supporting a substantial portion of the weight of said floating frame and for performing a hold down function, a rotating cutter assembly operationally disposed on said floating frame adjacent said wheel and being of a dimension to intercept the ground as well as any canes lying in its path during its rotating movement, the plane of rotation of said cutter assembly being substantially perpendicular to the direction of movement of said wheeled main frame and said floating frame over the ground, said wheel serving to hold at least some of the canes encountered by said cutter assembly essentially stationary during the time said cutter assembly is acting thereon.

5. The device as defined in claim 4 in which there is a preestablished relationship between the speed of travel of the device over the ground, and the rotating speed of said cutter assembly.

6. The device as defined in claim 4 in which a pair of angularly disposed wheels mounted in operative relationship on a forward portion of said floating frame are utlized for contacting the canes and aligning same prior to their encounter with said cutter assembly.

7. The device as defined in claim 4 in which covering wheels are disposed behind said cutter assembly, in operative relationship with respect to said floating frame, said covering wheels forcibly engaging the ground in an angular relationship and serving to cover the cut canes with earth.

8. The device as defined in claim 7 in which a packing wheel operatively associated with said device is utilized behind said covering wheels, power applying means associated with said packing wheel, thus making it possible to pack the earth tightly around the covered canes.

9. The device as defined in claim 4 in which a plurality of floating frames are pivotally connected with respect to said main frame, and being vertically movable to at least some extent with respect to said main frame, thereby enabling the canes in a plurality of rows to be cut at essentially the same time.

10. A device for cutting seed cane comprising a wheeled main frame that can be caused to move through a field, a plurality of floating frames pivotally connected to said main frame and vertically movable to at least some extent with respect to said main frame, at least one wheel located on the underside of each floating frame for supporting a substantial portion of the weight of the respective floating frame, a rotating cutter assembly operationally disposed on each of said floating frames and being of a dimension to intercept the ground during its rotating movement, means for driving each cutter assembly in rotation, thus to enable them to cut encountered canes lying on the ground thereunder, said wheel positioned with regard to its respective cutter assembly as to serve to hold encountered canes essentially stationary while they are being acted upon and cut by the respective cutter assembly, the plane of rotation of said cutter assemblies being substantially perpendicular to the direction of movement of said wheeled main frame and said floating frames over the ground.

11. The device as defined in claim 10 in which there is a preestablished relationship between the speed of travel of the device over the ground, and the rotating speed of said cutter assemblies.

12. The device as defined in claim 10 in which a pair of angularly disposed wheels are operatively associated with a forward portion of said floating frame, said wheels being in rolling contact with the ground and utilized for aligning the canes prior to the encounter thereof with said cutter means.

13. The device as defined in claim 10 in which the operative height of each floating frame is independently adjustable with respect to said main frame.

14. The device as defined in accordance with claim 10 in which at least one covering wheel is operatively disposed with respect to a rear portion of each of said floating frames, being located behind each respective cutter assembly, said covering wheels forcibly engaging the ground at an angle and serving to cover the cut canes with earth.

15. The device as defined in claim 14 in which a packing wheel operatively associated with said device is disposed behind each covering wheel, power applying means associated with each packing wheel, thus making it possible to pack the earth tightly around the covered canes.

16. The device as defined in claim 10 in which a superstructure is mounted upon said main frame, a plurality of actuators supported by said superstructure, with at least one actuator being operatively associated with each of said floating frames, means for controlling the operation of said actuators independently, such that selected ones of said floating frames may be raised to an inoperative position with respect to said main frame.

* * * * *